United States Patent
Yoshizu

(10) Patent No.: US 9,644,967 B2
(45) Date of Patent: May 9, 2017

(54) RECOMMENDATION INFORMATION PROVISION SYSTEM

(75) Inventor: Sayaka Yoshizu, Kawasaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/129,202

(22) PCT Filed: Jul. 5, 2011

(86) PCT No.: PCT/JP2011/065354
§ 371 (c)(1),
(2), (4) Date: Dec. 24, 2013

(87) PCT Pub. No.: WO2013/005299
PCT Pub. Date: Jan. 10, 2013

(65) Prior Publication Data
US 2014/0129132 A1     May 8, 2014

(51) Int. Cl.
*G01C 21/00* (2006.01)
*G08G 1/01* (2006.01)
(Continued)

(52) U.S. Cl.
CPC .......... *G01C 21/00* (2013.01); *G01C 21/362* (2013.01); *G01C 21/3617* (2013.01);
(Continued)

(58) Field of Classification Search
None
See application file for complete search history.

(56) References Cited

U.S. PATENT DOCUMENTS

| 7,788,030 B2 * | 8/2010 | Kato | G01C 21/343 340/988 |
| 8,892,350 B2 * | 11/2014 | Weir | G09B 29/00 701/400 |

(Continued)

FOREIGN PATENT DOCUMENTS

| EP | 1 577 642 A1 | 9/2005 | |
| JP | 2002-228476 * | 8/2002 | G01C 21/00 |

(Continued)

OTHER PUBLICATIONS

Extended European Search Report issued Jan. 30, 2015 in Patent Application No. 11868930.6.

(Continued)

*Primary Examiner* — Truc M Do
*Assistant Examiner* — Jess Whittington
(74) *Attorney, Agent, or Firm* — Oblon, McClelland, Maier & Neustadt, L.L.P.

(57) ABSTRACT

A recommended-information providing system outputs recommended information about a destination in order to provide the recommended information for the information terminal. Collecting circuitry collects a plurality of action histories based on a plurality of action patterns of one or more moving bodies. Generating circuitry generates the recommended information for each attribute of the destination, which is a facility with a plurality of entrances, based on the plurality of collected action histories. Outputting circuitry outputs the recommended information generated according to the attribute of the requested destination in order to provide the recommended information for the information terminal.

11 Claims, 7 Drawing Sheets

(51) Int. Cl.
　　　*G08G 1/0967* (2006.01)
　　　*G01C 21/36* (2006.01)
　　　*G06Q 30/02* (2012.01)
(52) U.S. Cl.
　　　CPC ....... *G06Q 30/0266* (2013.01); *G08G 1/0112* (2013.01); *G08G 1/0129* (2013.01); *G08G 1/0141* (2013.01); *G08G 1/09675* (2013.01); *G08G 1/096716* (2013.01); *G08G 1/096775* (2013.01)

(56) References Cited

U.S. PATENT DOCUMENTS

| | | | | |
|---|---|---|---|---|
| 2006/0271285 | A1* | 11/2006 | Usui | G01C 21/3667 701/533 |
| 2007/0016367 | A1* | 1/2007 | Sakashita | G01C 21/3658 701/431 |
| 2007/0198176 | A1* | 8/2007 | Endo | G01C 21/26 701/450 |
| 2010/0169199 | A1* | 7/2010 | Fuller | G06Q 10/08 705/34 |
| 2013/0002456 | A1* | 1/2013 | Fuller | G06Q 10/08 340/990 |
| 2014/0129132 | A1* | 5/2014 | Yoshizu | G08G 1/0112 701/400 |

FOREIGN PATENT DOCUMENTS

| | | | | |
|---|---|---|---|---|
| JP | 2002 228476 | | 8/2002 | |
| JP | 2005 227991 | | 8/2005 | |
| JP | 2006-275837 | * | 10/2006 | ............ G01C 21/00 |
| JP | 2006 275837 | | 10/2006 | |
| JP | 2007 10570 | | 1/2007 | |
| JP | 2007 72971 | | 3/2007 | |
| JP | 2008-128659 | * | 6/2008 | ............ G01C 21/00 |
| JP | 2008 128659 | | 6/2008 | |
| JP | 2009-244032 | * | 10/2009 | ............ G01C 21/00 |
| JP | 2009 244032 | | 10/2009 | |
| JP | 2010 276396 | | 12/2010 | |
| JP | 2011-047823 | * | 3/2011 | ............ G01C 21/00 |
| JP | 2011 47823 | | 3/2011 | |
| WO | 2007 116650 | | 10/2007 | |

OTHER PUBLICATIONS

International Preliminary Report on Patentability issued Jan. 5, 2014 in PCT/JP2011/065354 field Jul. 5, 2011 (English translation only).

International Search Report Issued Aug. 16, 2011in PCT/JP11/065354 Filed Jul. 5, 2011.

* cited by examiner

RECOMMENDATION INFORMATION PROVISION SYSTEM

FIELD OF THE DISCLOSURE

The present invention relates to a recommended-information providing system that provides recommended information generated based on the travel histories of a moving body.

BACKGROUND OF THE DISCLOSURE

Generally, in a navigation system incorporated in a vehicle, route guidance from a start point to a destination is provided using voice, images, or the like. In route guidance by such a navigation system, the name, address, telephone number, and so on of a destination point are first input by a driver via the input device or the like of the navigation system, and this input point is set as the destination. When driving is aided by the navigation system, guidance for a route from the present position of the vehicle to the set destination is provided for the user (driver) as well as surrounding traffic information, and the like.

Such a navigation system is provided with, for example, the function of recording the travel histories of a vehicle incorporating the navigation system, and then providing a driver with a recommended destination based on the recorded travel histories when a destination is set. For example, the navigation system described in Patent Document 1 records the travel history of a vehicle, identifies the stopped position of the vehicle from, for example, the on-state/off-state of the ignition key, and stores the identified point as a destination. Additionally, in the navigation system described above, discrimination is made, based on the travel histories of the vehicle, whether the point at which the vehicle stopped was a destination or a place where the vehicle stopped by on the way to the destination, and the result of the discrimination is also stored. The navigation system provides a driver with information about destinations and so on thus stored. Thus, when a destination is set by a driver, the navigation system is capable of providing the driver with a recommended destination highly accurately.

PRIOR ART DOCUMENTS

Patent Documents

Patent Document 1: Japanese Laid-Open Patent Publication No. 2007-10570

SUMMARY OF THE INVENTION

Problems that the Invention is to Solve

The travel histories of a vehicle recorded in the navigation system are merely results in which the actions of the user of the vehicle are reflected, and are items of information that are already known to the user (driver). However, information about a destination or the like requested by a user, is not always information about such a known place. However, for example, in a case where a user is less familiar with a place, such as one the user visits for the first time, useful information about the place, that is, recommended information, may be highly likely to be requested as the user knows nothing about the place. Therefore, in recent years, there has been a demand for developments of a system that is capable of actively providing such recommended information about a destination. Such a demand is common to a navigation system incorporated in a vehicle and an information terminal that is capable of recording the actions of a user.

Accordingly, it is an objective of the invention to provide a recommended-information providing system that is capable of providing a user of an information terminal with recommended information about a destination.

Means for Solving the Problems

To achieve the foregoing objective, the present invention provides a recommended-information providing system that outputs recommended information worthy of recommendation about a destination in order to provide the recommended information for the information terminal. The system is configured to: collect a plurality of action histories based on a plurality of action patterns of one or more moving bodies; generate the recommended information for each attribute of the destination based on the plurality of collected action histories; and output the recommended information generated according to the attribute of the requested destination in order to provide the recommended information for the information terminal.

Generally, a user of a moving body such as a vehicle or various portable apparatuses often behaves based on information known to the user, and preferences of the user or information known to the user may be greatly reflected in the action patterns. Therefore, by analyzing the action histories of such action patterns, it is possible to obtain a destination highly frequently visited by each user among certain attributes such as a restaurant or a facility, or to obtain a common route that is highly frequently used in a case where there is a plurality of routes to the destination. Information obtained through such analyses may be known to a certain user as it indicates the action histories of the user. However, such information may be often unknown to other users and helpful for them.

Therefore, as in the foregoing configuration, action histories of a plurality of moving bodies or action histories of a moving body used by a plurality of users are collected. Based on the collected action histories, recommended information worthy of recommendation about each destination is generated for each of attributes such as various stores and various public facilities. When a certain attribute is requested by an information terminal, recommended information about a destination of the requested attribute is provided to the information terminal that made the request. Therefore, it is possible to generate, from the action histories of a plurality of users, recommended information meeting the request, and possible to provide this generated recommended information to the information terminal that made the request.

Accordingly, it is possible to provide a user of an information terminal with recommended information about a destination, generated based on the action histories of a plurality of moving bodies.

In accordance with one aspect of the present invention, the plurality of action histories based on the plurality of action patterns of the one or more moving bodies are action histories of one or more vehicles based on a plurality of types of vehicle operation.

The action pattern of a driver who operates the vehicle tends to be greatly reflected in the action histories of a vehicle. Such a vehicle may be often used for travel from its base, such as a home, to destinations such as various facilities. Therefore, the action histories tend to include a greater number of and a wide range of action patterns.

Additionally, such action histories of a vehicle differ according to each vehicle or each of drivers who use a shared vehicle. Therefore, by collecting the action histories of a vehicle based on a plurality of types of vehicle operations, action histories including a variety of action patterns can be collected.

Therefore, by generating the recommended information based on the collected action histories of the vehicle, a further variety of recommended information can be generated based on a wider range of and various action patterns. Additionally, by generating recommended information based on the action histories of the vehicle in such a manner, the generated recommended information can be provided to a driver via a navigation system, or the like, incorporated in the vehicle. Accordingly based on recommended information provided via this navigation system, it is possible to set a destination or route guidance to the destination, thus utilizing the action histories of the vehicle based on a plurality of types of vehicle operation.

In accordance with one aspect of the present invention, the action histories are action histories of the vehicles at the destination.

An action pattern of the vehicle changes according to conditions at a facility that has been set as a destination point. Therefore, by analyzing the action histories of the vehicle at the destination, conditions and so on at the facility, or the destination, can be determined. Based on the result of the determination, recommended information such as guidance for conditions at the facility as the destination can be generated.

In accordance with one aspect of the present invention, the action histories are action histories from a start point of the vehicles to the destination.

The action histories from its start point of the vehicle to the destination include a route used to reach the destination. A route indicated by such an action history indicates a route with higher frequency of use that is often used by a user familiar with the destination, and hence, is very convenient.

Therefore, as in the foregoing configuration, action histories until the vehicle reaches the destination from its start point are collected as the action histories of the vehicle. Thereby, based on these collected action histories, it is possible to provide information and so on about a route worthy of recommendation, as a route to the destination of the user of the information terminal, to which the recommended information is to be provided.

In accordance with one aspect of the present invention, the action histories are histories in which an action history from a start point to the destination of each vehicle and an action history of the vehicle at the destination after reaching the destination are related to each other.

Generally, the action history of the vehicle until the vehicle reaches a destination and the action history as it reaches the destination have a certain correlation. By relating these action histories to each other, it is possible to collect a series of action histories from when the vehicle left for a destination to when it has reached the destination. Therefore, for example, in a case where a certain large complex facility is provided with a plurality of parking spaces or the like that allow entry from a plurality of directions, and there are a plurality of routes to these parking spaces from the start point, action histories are collected, in which travel histories of a plurality of patterns until moving bodies reach corresponding parking spaces from their respective start points and action histories indicating the parking, stopping, and so on of the moving bodies at the corresponding parking spaces are related to each other.

Based on the action histories at a destination, it is also possible to estimate the reason why the vehicle left for the destination. By relating such an action history at the destination and the action history as it reaches the destination to each other, it is possible to achieve more detailed, highly accurate identification of the action history of the vehicle, for collecting the action history of the vehicle such as the form of the use of each destination, an action indicated by each action history, and the like. Accordingly, based on the action histories thus identified in detail and with high accuracy, more helpful recommended information can be generated.

In accordance with one aspect of the present invention, the action histories at the destination include time spent at the destination by each vehicle and the frequency of visit to the destination by each vehicle.

As in the foregoing configuration, by collecting, as action histories, times stayed at the corresponding destinations of the moving bodies, it is possible to estimate times required to achieve their respective purposes at the destinations. In this case, it is possible to provide, as the recommended information, an approximate required time when each vehicle stops at the requested destination. Additionally, if the time spent at the destination (including a place near the destination), indicated by the action history, is temporary, it is possible to estimate that the action history indicates an action history obtained when each moving body left for drop-off/pick-up. In this case, it is possible to estimate that the more suitable the time a moving body stays is for drop-off/pick-up, the more suitable the point is for drop-off/pick-up at the destination. Accordingly, information for guidance to the point suitable for drop-off/pick-up can be provided as the recommended information.

In accordance with one aspect of the present invention, the action histories at the destination include at least either an opening/closing history of the doors other than the door at the driver's seat of the vehicle or a history of use of the hazard lamps of the vehicle.

When a door on the side of a front passenger seat of the vehicle or a door on the side of a rear seat of the vehicle is opened/closed, it is possible to estimate that a person was dropped off/picked up at the destination. It is possible to determine that the higher the frequency of opening/closing a door or doors is, the more suitable the point is for drop-off/pick-up at the destination. Then, by providing, as the recommended information, guidance to the point determined to be suitable for drop-off/pick-up, it is possible to guide to the point suitable for drop-off/pick-up at the destination.

Additionally, when a vehicle parks or stops, hazard lamps are generally used. Based on the history of use of the hazard lamps, it is possible to estimate whether the vehicle was parked/stopped or a person was dropped off/picked up at the destination. Therefore, in this case also, it is possible to determine that the higher the frequency of using the hazard lamps due to the parking/stopping of the vehicle is, the more suitable the point is for drop-off/pick-up at the destination. Then, by providing, as the recommended information, guidance to the point determined to be suitable for drop-off/pick-up, it is possible to guide to the point suitable for drop-off/pick-up at the destination.

In accordance with one aspect of the present invention, the action histories from the start point to the destination of the vehicle include travel time and travel distance of the vehicle.

According to the foregoing configuration, a travel time and a travel distance required to reach a destination from a certain start point can be obtained based on the collected action histories of each moving body. Accordingly, it is possible to provide, as the recommended information, the travel time and travel distance actually required for each moving body to reach its destination.

In accordance with one aspect of the present invention, the action histories include drop-off/pick-up history of each moving body from a base of the moving body to the destination. The recommended information is information for guidance to an entrance at the destination or information for guidance to a parking space. The recommended-information providing system is configured to use the drop-off/pick-up history as the operating histories when generating the recommended information.

A moving body may go to a destination, for example, because a user of the moving body visits the destination or because a drop-off/pick-up at the destination is required. In a case where the destination of the moving body is, for example, a place where a person, and the like, is dropped off/picked up, a place suitable for drop-off/pick-up may be often selected rather than a parking space or the like, where the vehicle can stay for a long time, within the destination. Such drop-off/pick-up by a moving body takes place from a base such as the home of the user of the moving body to its destination.

Therefore, as in the foregoing configuration, drop-off/pick-up history when the moving body left for the destination from its base is used as the action histories of the moving body. This makes it possible to extract a drop-off/pick-up history, which indicates that a person, and the like, was dropped off/picked up, from among various action histories. Accordingly, based on the extracted drop-off/pick-up history, it is possible to accurately generate recommended information for guidance to a parking space or entrance suitable for drop-off/pick up.

In accordance with one aspect of the present invention, the destination is a facility with a plurality of entrances. The recommended-information providing system is configured to generate, as the recommended information, information for guidance to an entrance provided with a drop-off/pick-up space among the plurality of entrances, which allows a moving body for drop-off/pick-up to stay.

For example, in stations, various stores, facilities, and the like, a plurality of entrances and parking spaces are often provided. Generally, routes to the entrances or parking spaces vary according to the places where the entrances or parking spaces are provided. Usually, stations and various facilities or the like are provided with drop-off/pick-up spaces. Therefore, it is desirable that drop-off/pick-up at the stations or various facilities be carried out at entrances with such drop-off/pick-up spaces. Particularly, entrances (ticket gates) are often located across railroads or the like in stations. Therefore, it is highly necessary to provide guidance to an entrance or parking space suitable for drop-off/pick-up.

Therefore, for example, based on action histories about various facilities such as a station with a plurality of entrances, guidance for the location of an entrance with a drop-off/pick-up space or guidance for a route to the entrance is provided as the recommended information. Thereby, through an information terminal to which the recommended information is to be provided, it is possible to guide the user of the information terminal to the drop-off/pick-up space accurately.

In accordance with one aspect of the present invention, the system is configured to identify, as an entrance provided with the drop-off/pick-up space, an entrance with the highest frequency of drop-off/pick-up among the plurality of entrances or an entrance with the largest variety of distribution in the traveling direction of the moving body among the plurality of entrance.

In a destination with a plurality of entrances, an entrance with high frequency of drop-off/pick-up is often used for drop-off/pick-up, and it is highly possible that the entrance has a drop-off/pick-up space, at which a vehicle or the like can park or stop. The entrance that is provided with a drop-off/pick-up space is more often used for drop-off/pick-up than the entrance that is not provided with a drop-off/pick-up space. Additionally, if a plurality of entrances is provided with a drop-off/pick-up space, a route with no running restrictions such as one-way traffic is desirable.

Therefore, as in the foregoing configuration, guidance to an entrance with high frequency of drop-off/pick-up or an entrance with a variety of distribution in the traveling direction of the moving body exiting the entrance is provided as an entrance with a drop-off/pick-up space. Thereby, the user of the information terminal can be accurately guided to the drop-off/pick-up space.

Where information about an entrance with a drop-off/pick-up space is registered in advance for each of various facilities, such as stations, into map data or the like that is registered in, for example, a navigation system, check of each facility and the number of steps, required for the registration, is complex, resulting in a huge volume of data. In this respect also, according to the foregoing configuration, it is possible to provide recommended information for guiding a user to the drop-off/pick-up space without generating such database in advance.

In accordance with one aspect of the present invention, the attribute of the destination includes stores. The recommended-information providing system is configured to identify a store with high frequency of visit by the moving bodies based on the action histories from among stores located in the area near the information terminal to which recommended information is to be delivered, and deliver information about the identified store to the corresponding information terminal as the recommended information.

It is highly possible that a store with high frequency of visit may be a popular store used by many users, and it can be estimated as a store worthy of recommendation. Therefore as in the foregoing configuration, a store with high frequency of visit is identified based on the action histories, and guidance for the identified store and guidance for a route to the store are provided as the recommended information. Thereby, recommended information in which preferences of each user are reflected can be provided based on the action histories of each user who actually visited the store.

DETAILED DESCRIPTION OF THE PREFERRED EMBODIMENTS

First Embodiment

A recommended-information providing system according to a first embodiment of the present invention will be described below with reference to FIGS. 1 to 4. The recommended-information providing system according to the present embodiment provides, as recommended information as described above, information indicating a point at a destination provided with a drop-off/pick-up space, which point allows drop-off/pick-up by a vehicle.

Figure 1:
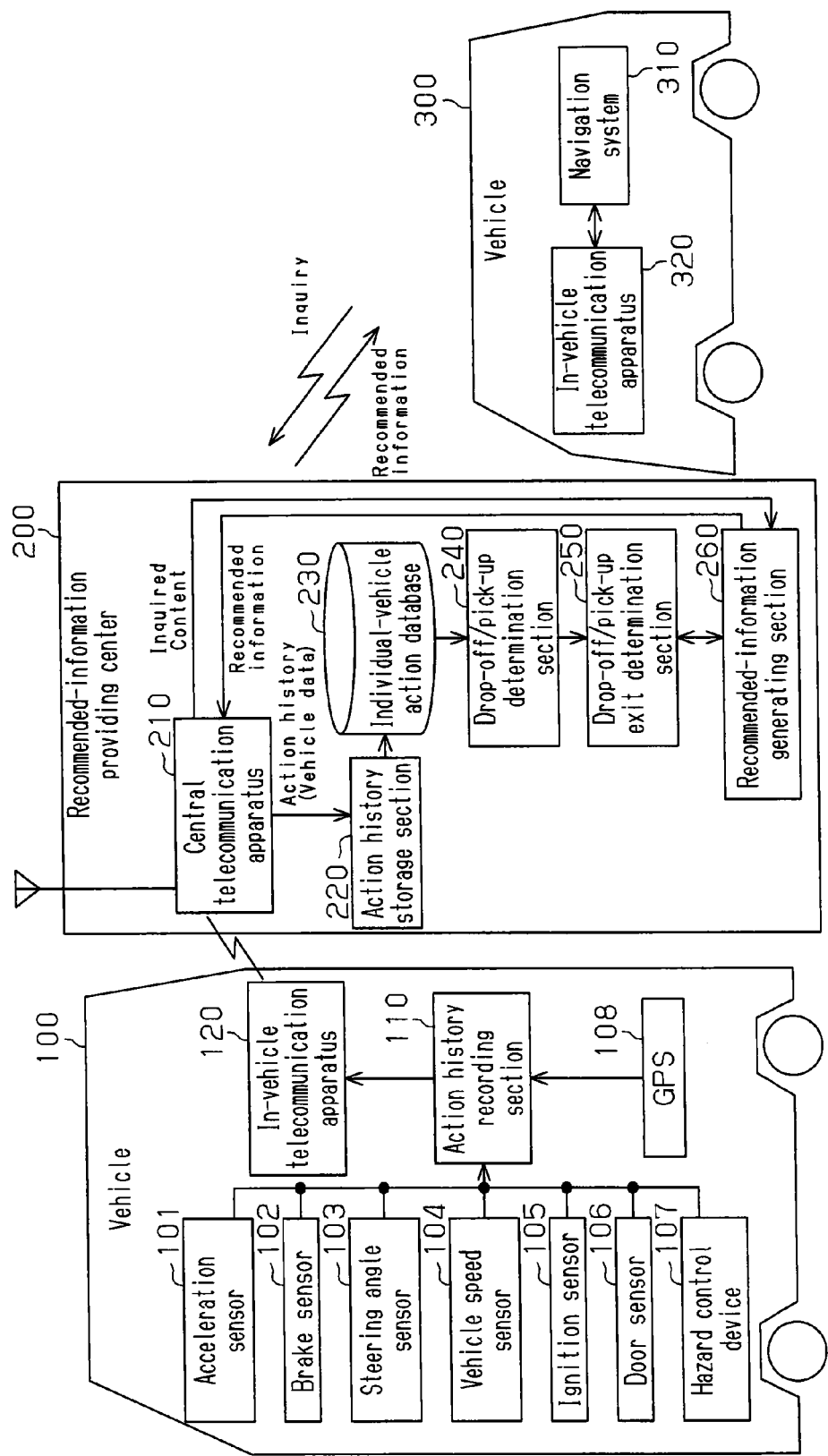
FIG. 1 is a block diagram of a schematic configuration of a recommended-information providing system according to a first embodiment of the present invention.

As shown in FIG. 1, the recommended-information providing system according to the present embodiment comprises a recommended-information providing center 200, which collects, as the action history of a vehicle 100, vehicle data for the vehicle 100 in which driving operations performed by a driver of the vehicle 100, which is a moving body, are reflected.

The vehicle 100 serving as a source for capturing vehicle data (action histories) includes, as means for capturing vehicle data for the vehicle 100, for example, an acceleration sensor 101, a brake sensor 102, a steering angle sensor 103, a vehicle speed sensor 104, and an ignition sensor 105. Additionally, the vehicle 100 includes a door sensor 106 that detects opening/closing of each door of the vehicle 100, a hazard control device 107 that controls the lighted states of hazard lamps used when the vehicle 100 parks or stops, a GPS 108 that detects the absolute position of the vehicle 100, and so on. Such sensors 108 are connected to an action history recording section 110 in which detection results, and so on, obtained from such sensors 101 to 108, are recorded as the action history of the vehicle 100 via an in-vehicle network such as control area network (CAN).

The acceleration sensor 101 detects the accelerator operation amount, which is changed by an accelerator pedal operation performed by a driver, and outputs a signal corresponding to the detected accelerator operation amount, to the action history recording section 110. The brake sensor 102 detects the degree by which a brake pedal is depressed by a driver, and outputs a signal corresponding to the detected degree of depression, to the action history recording section 110. The steering angle sensor 103 detects a change in steering angle by a steering operation performed by a driver, and outputs a signal corresponding to this detected steering angle, to the action history recording section 110. The vehicle speed sensor 104 detects the revolving speeds of the wheels of the vehicle 100, and outputs signals corresponding to the detected revolving speeds, to the action history recording section 110. The ignition sensor 105 outputs signals indicating the on or off state of an ignition turned on or off by the driver starting or ceasing running of the vehicle 100, to the action history recording section 110. The door sensor 106 detects opening/closing of each door of the vehicle 100, and outputs the detected signal to the action history recording section 110. The hazard control device 107 controls the hazard lamps according to the operation of the hazard lamps turned on or turned off by a driver according to a stopping operation or the like for the vehicle 100, and outputs the control result to the action history recording section 110. The GPS 108 receives GPS satellite signals for detecting the absolute position of the vehicle, detects the latitude and longitude of the vehicle 100 based on the received GPS satellite signals, and outputs information indicating the detected latitude and longitude of the vehicle 100 to the action history recording section 110.

Upon input of the detection results of such sensors 101 to 105, the control result of the hazard control device 107, and the detection result of the GPS 108, the items of information input are stored in the action history recording section 110 in chronological order. Consequently, each time the vehicle 100 is used for a driver's transport, the travel speed, travel time, travel distance, travel routes, and so on of the vehicle 100, for example, from home to various facilities, such as a store or station or the like, which is a destination, are recorded in the action history recording section 110 as the action histories of the vehicle 100 from start point to destination. Additionally, the opening/closing history of the doors of the vehicle 100 as it reaches each destination, the use of hazard lamps, time spent at the destination, and the like, are recorded in the action history recording section 110 as action history of the vehicle 100 as it reaches a destination. In the present embodiment, such a series of action histories, that is, the action histories of the vehicle 100 until it reaches a destination and the action histories of the vehicle 100 as it reaches the destination are related to each other and recorded in the action history recording section 110.

Additionally, the vehicle 100 has an in-vehicle telecommunication apparatus 120 that is capable of communicating wirelessly with the recommended-information providing center 200. When the ignition is switched from an on-state to an off-state, which is detected by the ignition sensor 105 as a result of, for example, ceasing of the running of the vehicle 100, the in-vehicle telecommunication apparatus 120 transmits to the recommended-information providing center 200 vehicle data indicating the action history accumulated in the action history recording section 110. The vehicle 100 according to the present embodiment has a vehicle ID specific to, for example, the vehicle 100. When the vehicle data is transmitted, the vehicle ID is transmitted to the recommended-information providing center 200 together with the vehicle data.

The recommended-information providing center 200 includes a central telecommunication apparatus 210 that receives vehicle data transmitted from a plurality of vehicles, such as the vehicle 100. The central telecommunication apparatus 210 receives vehicle data captured by each vehicle and outputs the received vehicle data to an action history storage section 220. Through wireless communication between the central telecommunication apparatus 210 and the in-vehicle telecommunication apparatus, which is incorporated in each vehicle, the action history storage section 220 accumulates the action histories of vehicles based on a plurality of types of driving operations captured by the vehicles.

Additionally, the vehicle 100 includes an individual-vehicle action database 230, in which action histories stored in the action history recording section 110 are categorized and stored for each vehicle. In the individual-vehicle action database 230, each vehicle is identified based on the vehicle ID transmitted together with the action histories of the vehicle. Then, in the individual-vehicle action database 230, action histories collected from vehicles are categorized and stored for each identified vehicle. Thus, the individual-vehicle action database 230 stores, for each vehicle, action histories indicating position information obtained when the ignition is turned on at the start point of the vehicle and indicating the travel speed, travel time, travel distance, travel route, and the like of the vehicle, obtained until the vehicle that has left the start point reaches its destination and the ignition is turned off. The individual-vehicle action database 230 also stores histories and so on indicating the position information for each vehicle when a vehicle that has left the start point turned off its ignition at its destination, and indicating staying time, opening/closing history of the doors, use of hazard lamps, and the like, at the destination.

Additionally, the recommended-information providing center 200 according to the present embodiment includes a drop-off/pick-up operation determination section 240 that discriminates a drop-off/pick-up history, which is a history indicating the drop-off/pick-up of a person from a home, or the like, as a base for each vehicle, to a destination, from among the vehicle action histories stored in the individual-vehicle action database 230. When discriminating drop-off/pick-up history, the drop-off/pick-up operation determination section 240 estimates, for example, the point where the frequency of start is high among the start points of the vehicle or the point where staying time of the vehicle is long, as a base, such as the home of the driver, for each vehicle. The drop-off/pick-up operation determination section 240 identifies, from among action histories stored in the individual-vehicle action database 230, an action history in which a vehicle that has left the estimated base for a destination with a plurality of entrances, as of a large complex facility or station, and then the vehicle returns to its base after arriving at the destination. Additionally, the drop-off/pick-up operation determination section 240 further identifies, from the action history thus identified, an action history including opening/closing history of doors other than the one for the driver's seat or the history of use of hazard lamps. The drop-off/pick-up operation determination section 240 determines the action history thus identified as a drop-off/pick-up history of a vehicle that has traveled to a large complex facility, station, or the like, with a plurality of entrances, in order to drop off/pick up a person at the place. Additionally, based on the drop-off/pick-up history thus determined, the drop-off/pick-up operation determination section 240 outputs the result of the determination to a drop-off/pick-up exit determination section 250 that determines the entrance with a drop-off/pick-up space from among the entrances at each destination.

Upon input of the drop-off/pick-up history of each vehicle from the drop-off/pick-up operation determination section 240, the drop-off/pick-up exit determination section 250 determines based on this drop-off/pick-up history the entrance of the highest frequency of drop-off/pick-up at a destination with a plurality of entrances, or the entrance with the largest variety of distribution in the traveling direction of vehicles among a plurality of entrances, as the entrance providing drop-off/pick-up space allowing vehicles to stay.

Additionally, the recommended-information providing center 200 according to the present embodiment includes a recommended-information generating section 260 that generates recommended information based on a determination result obtained from the drop-off/pick-up exit determination section 250. When a navigation system 310 incorporated in a certain vehicle 300 and composing an information terminal, to which recommended information is to be provided, inquires about information regarding a certain "station," which is an attribute set in the navigation system 310 as a destination, the recommended-information generating section 260 captures from the drop-off/pick-up exit determination section 250 a determination result regarding the entrances of a corresponding station. Then, based on the captured determination result, the recommended-information generating section 260 generates recommended information for guiding to an entrance provided with a drop-off/pick-up space among a plurality of entrances of the station about which the navigation system 310 has inquired. Then, the recommended-information generating section 260 delivers the generated recommended information to the navigation system 310, from which the inquiry originates.

In the vehicle 300, which may use the recommended information, the recommended information delivered from the recommended-information providing center 200 is received by an in-vehicle telecommunication apparatus 320, and the received recommended information is taken into the navigation system 310. Based on the recommended information thus taken in, the navigation system 310 provides a user (driver) with guidance for route to the entrance provided with a drop-off/pick-up space, by means of voice, images, or the like.

Next, a manner in which a drop-off/pick-up point is identified according to the recommended-information providing system according to the present embodiment will be described with reference to FIG. 2.

Figure 2:
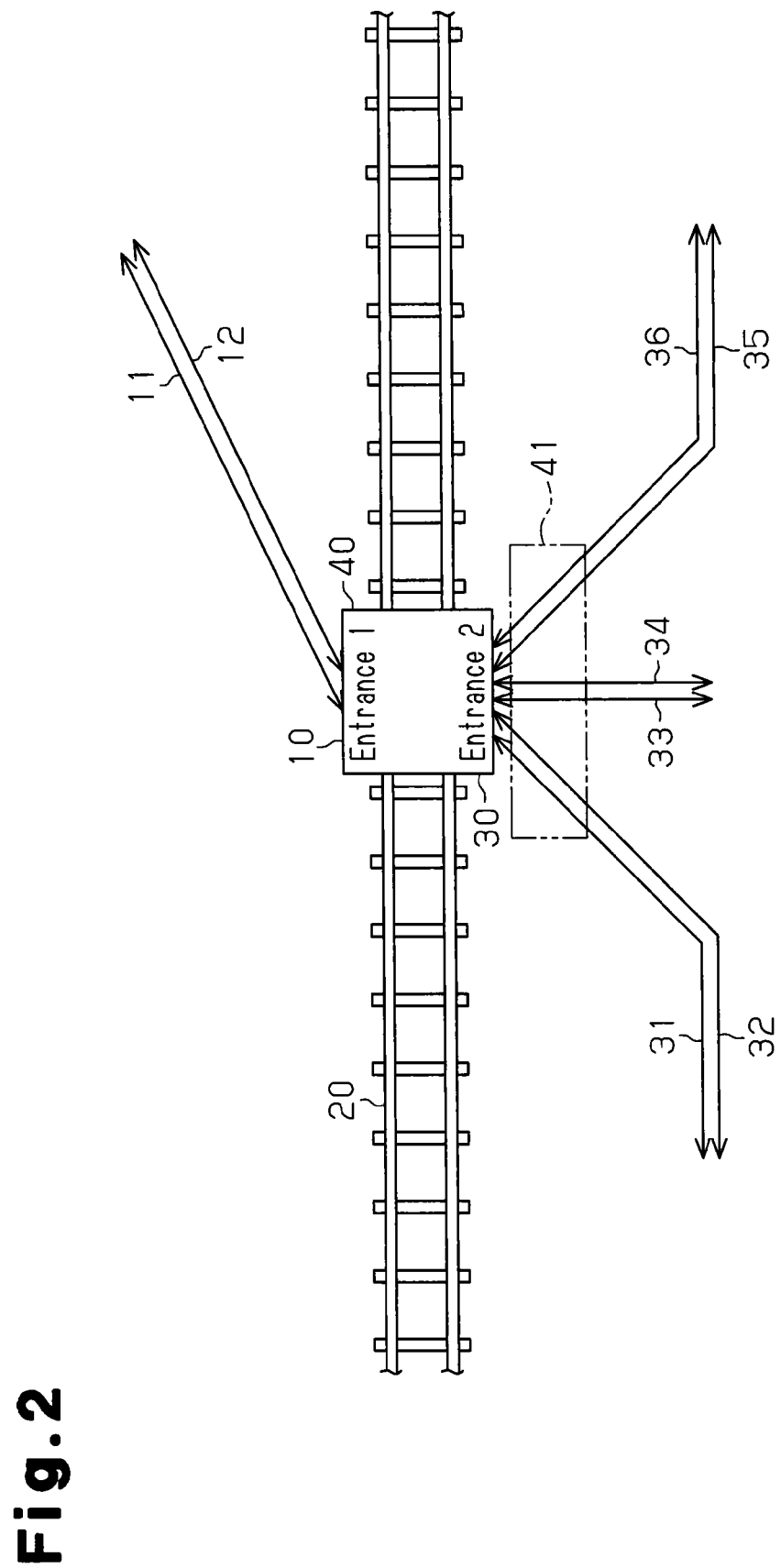
FIG. 2 is an example of a drop-off/pick-up pattern of a vehicle at a destination.

As shown in FIG. 2, it is supposed that a station 40 having, for example, a first entrance 10 and a second entrance 30 opposite the first entrance 10 with a railroad 20 between them is used as a destination for each of the vehicles, that is, as an attribute. Additionally, it is supposed that in this station 40, only the second entrance 30 is provided with a drop-off/pick-up space 41 at which each vehicle can drop off/pick up a person.

When such a station 40 is used for drop-off/pick-up of a person, the frequency of use of the second entrance 30 provided with the drop-off/pick-up space 41 is higher than the other in the drop-off/pick-up histories of vehicles, as indicated by patterns 31 to 36 of the respective drop-off/pick-up histories of vehicles in the second entrance 30 and by the patterns 11 and 12 of the respective drop-off/pick-up histories of vehicles in the first entrance 10. Additionally, in this example, the traveling direction of vehicles in the second entrance 30 has more variety than those in the first entrance 10 since, for example, there are no running restrictions such as one-way traffic on a route to the second entrance 30, or there are roundabouts.

Therefore, in the present embodiment, based on the patterns 11 and 12 and patterns 31 to 36 of such drop-off/pick-up histories, the second entrance 30 with a high frequency of drop-off/pick-up is identified, from the first and second entrances 10 and 30 of the station 40, as an entrance suitable for drop-off/pick-up by the recommended-information providing center 200, and recommended information for guidance to the second entrance 30 is provided by the recommended-information providing center 200.

Next, operation of the recommended-information providing system according to the present embodiment will be described with reference to FIG. 3.

Figure 3:
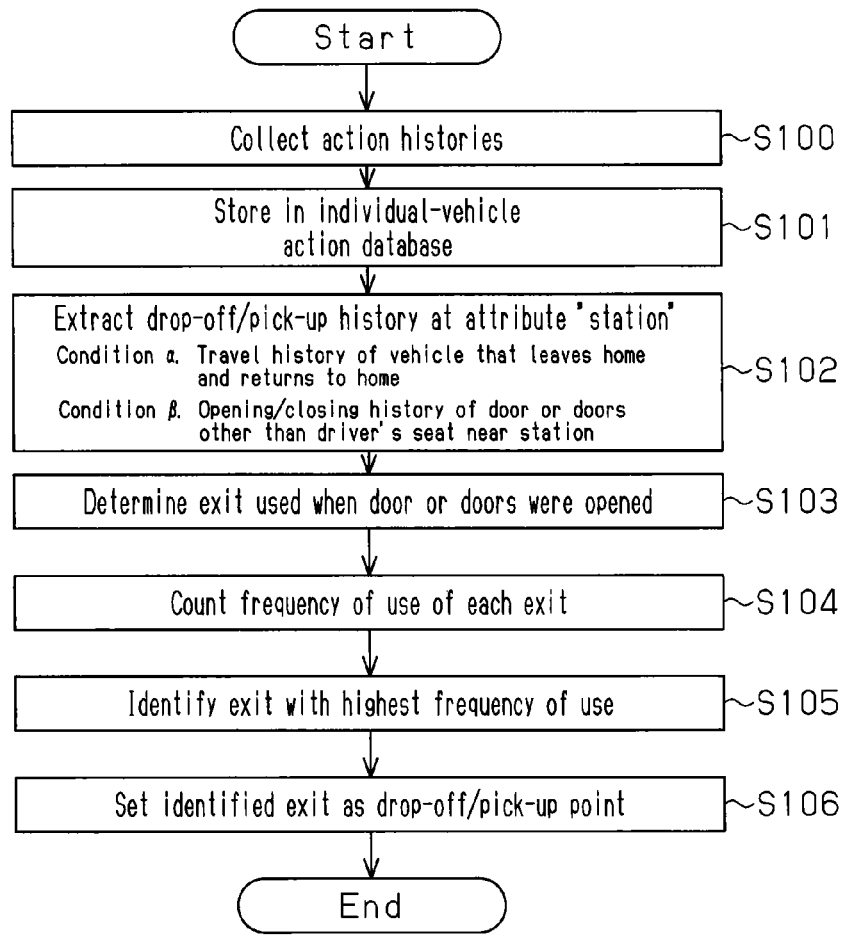
FIG. 3 is a flowchart illustrating an example of a procedure for generating recommended information by the recommended-information providing system.

As shown in FIG. 3, first in step S100, a plurality of action histories indicating a plurality of action patterns are collected from each vehicle, and the collected action histories of each vehicle are stored in the action history storage section 220 and individual-vehicle action database 230 (step S101).

Then, from among the action histories stored in the individual-vehicle action database 230, a drop-off/pick-up history to/from, for example, an attribute "station" is extracted (step S102). In this example, operation of the vehicle, indicated by the action history, is "the action of a vehicle that travels back and forth between the vehicle and a station" (condition α). Also, the history that includes "the opening/closing history of a door or doors other than the one on the driver's side at the station" (condition β) is extracted as a drop-off/pick-up history. In this extraction, only drop-off/pick-up histories accumulated, for example, within the past several months are extracted in order to extract the history more suitable for the present condition.

When a plurality of drop-off/pick-up histories about a certain station are extracted, the point where the door/doors are opened or closed, as well as the extracted drop-off/pick-up history, is determined. In other words, it is determined which one of the plurality of entrances of the station corresponds to the point where the door or doors are open (step S103). Based on the result of the determination, the frequencies of the drop-off/pick-up at the plurality of entrances of the station (frequency of use) are counted (step S104).

After the frequencies for the drop-off/pick-up are counted, the entrance used most frequently among the plurality of entrances of the station is identified based on the result of the count (step S105). The point corresponding to the entrance thus identified is identified as a drop-off/pick-up point provided with drop-off/pick-up space at the destination (step S106).

Next, a procedure for providing recommended information by the recommended-information providing system will be described with reference to FIG. 4.

Figure 4:
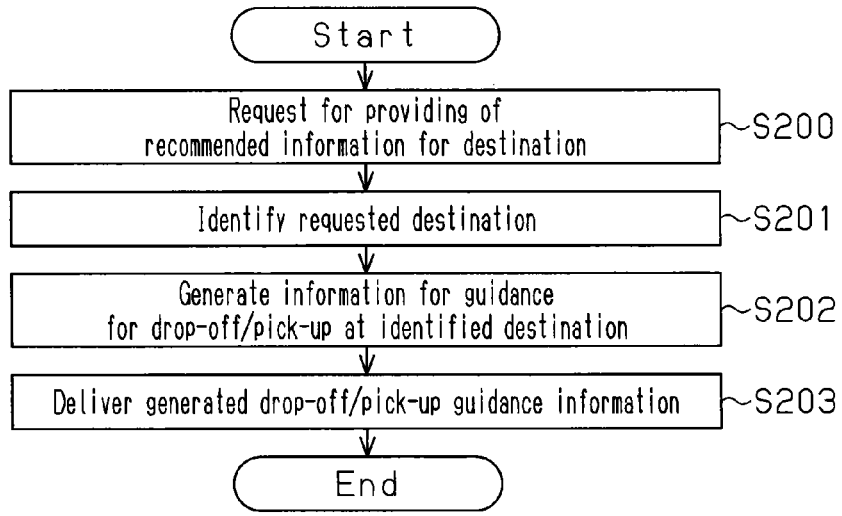
FIG. 4 is a flowchart illustrating an example of a procedure for delivering recommended information by the recommended-information providing system.

As shown in FIG. 4, first in step S200, when the providing of recommended information is requested via a navigation system 310 incorporated in the vehicle 300, to which the recommended information is to be provided, the attributes, name, and the like, of a destination corresponding to this request is identified (step S201). As a result, the attribute of the destination about which recommended information has been requested is identified as a station, store, a public institution, or the like, and the name or the like of the destination is also identified.

Then, information about guidance for drop-off/pick-up to the identified destination, that is, recommended information for guidance to the entrance provided with a drop-off/pick-up space for vehicles is generated (step S202). The recommended information thus generated is delivered to the navigation system 310 that made the inquiry (step S203). Thereafter, based on the recommended information delivered, the navigation system 310 guides the route to the drop-off/pick-up space indicated by the recommended information.

As described above, according to the recommended-information providing system, that is, the recommended-information providing center 200 according to the present embodiment, the advantages described below can be obtained.

(1) A plurality of action histories based on a plurality of action patterns of a plurality of vehicles are collected, and items of recommended information are generated according to the attributes of destinations based on these collected action histories. Then, according to the attributes of a requested destination, recommended information generated as described above is output to provide the navigation system 310 with the information. Accordingly, recommended information corresponding to a request can be generated from the action histories of a plurality of users. Therefore, since a user of the navigation system 310 may not know anything about a destination, the recommended-information providing center 200 can provide helpful information as well. Additionally, since the action histories of each vehicle indicate actions actually made by the vehicle, for example, for moving to a destination, these action histories reflect information about actual road conditions and conditions at the destination, and so on. Accordingly, by generating recommended information based on such action histories, highly practical information most suitable for present conditions can be provided.

(2) As a plurality of action histories based on a plurality of action patterns, the action histories of a plurality of vehicles based on a plurality of types of vehicle actions are collected. Accordingly, a variety of recommended information can be generated based on extensive, various action patterns. By generating recommended information based on the action histories of vehicles in such a manner, the generated recommended information can be provided to a driver via, for example, a navigation system 310 incorporated in, for example, a vehicle 300. Based on the recommended information provided via the navigation system 310, a user (driver) can set a destination or can set a route guide to the destination. Thus, the action histories of vehicles based on a plurality of types of vehicle operations can be used effectively.

(3) As the action histories described above, histories in each of which an action history until each vehicle reaches a destination from its start point and an action history at the destination that the vehicle has reached are related to each other and collected. Therefore, based on such action histories, operations of each vehicle as a source from which action histories are captured, can be identified in more detail and with higher accuracy. Accordingly, based on the action histories thus identified, more helpful recommended information can be generated.

(4) As the action histories at destinations, time spent at the destination by each vehicle and the frequency of visit to the destination are collected. This makes it possible to estimate a time required for a user to achieve a purpose at the destination. Accordingly, an approximate time required when the vehicle stops at a requested destination can be provided as well as the recommended information. Additionally, by virtue of this, not only the frequency of visit to a destination itself (station 40) but also the high frequency of visit to a point (second entrance 30) at the destination can be identified. Accordingly, recommended information for guidance to such an identified point can be provided when guidance to the destination is provided.

(5) As the action histories at destinations, action histories including the opening/closing history of the door or doors of each vehicle, other than the one for the driver's seat, and the history of use of the hazard lamps are collected. Accordingly, based on the opening/closing history of the door or doors and the history of use of the hazard lamps, as described above, a determination can be made whether each vehicle has left for a destination in order to drop off or pick up a person. The frequency of opening/closing a door or doors and the frequency of use of hazard lamps also make it possible to specify a point suitable for drop-off/pick-up.

(6) As the action histories from the respective start points of vehicles to a destination, described above, histories including the respective travel times and travel distances of the vehicles are collected. Therefore, based on the collected action histories, travel time and travel distance required from a certain start point to the destination can be obtained.

Accordingly, the travel time and travel distance thus obtained can be provided as well as the recommended information described above.

(7) As the action histories described above, histories including the respective drop-off/pick-up histories of vehicles to a destination from the respective bases of the vehicles are collected. Using the drop-off/pick-up histories, recommended information for guidance to an entrance or parking space at the destination is generated. Therefore, from among the respective action histories of the vehicles, collected in the recommended-information providing center 200, drop-off/pick-up histories, in which a person, and the like, are dropped off or picked up, can be extracted. Accordingly, based on the drop-off/pick-up histories thus extracted, recommended information for guidance to a parking space or entrance suitable for drop-off/pick-up can be generated accurately.

(8) As the recommended information described above, information is generated for guidance to an entrance (second entrance 30) provided with a drop-off/pick-up space 41 where a moving body for drop-off/pick-up can stay among a plurality of entrances provided at a destination. Accordingly, through the provision of such recommended information, a vehicle 300 equipped with the navigation system 310 to which the recommended information is delivered can be guided accurately to the drop-off/pick-up space 41 where the vehicle 300 can stay. Additionally, by virtue of this, even if a driver of the vehicle 300 visits a destination for the first time for drop-off/pick up, the driver can be guided to the drop-off/pick-up space 41 accurately based on the action patterns of many other drivers. Furthermore, by virtue of this, the navigation system 310 can provide guidance to the drop-off/pick-up space 41 without adding, in advance, position information about drop-off/pick-up spaces for each destination, to road map data, or the like, possessed by the navigation system 310.

(9) The entrance (second entrance 30) with the highest frequency of drop-off/pick-up among a plurality of entrances is identified as an entrance provided with the drop-off/pick-up space 41. Therefore, referring to the action histories based on the driving operation of each driver familiar with the destination, recommended information for guidance to the drop-off/pick-up space 41 can be generated. Accordingly, guidance to the drop-off/pick-up space based on the recommended information can be carried out accurately.

Second Embodiment

Figure 5:
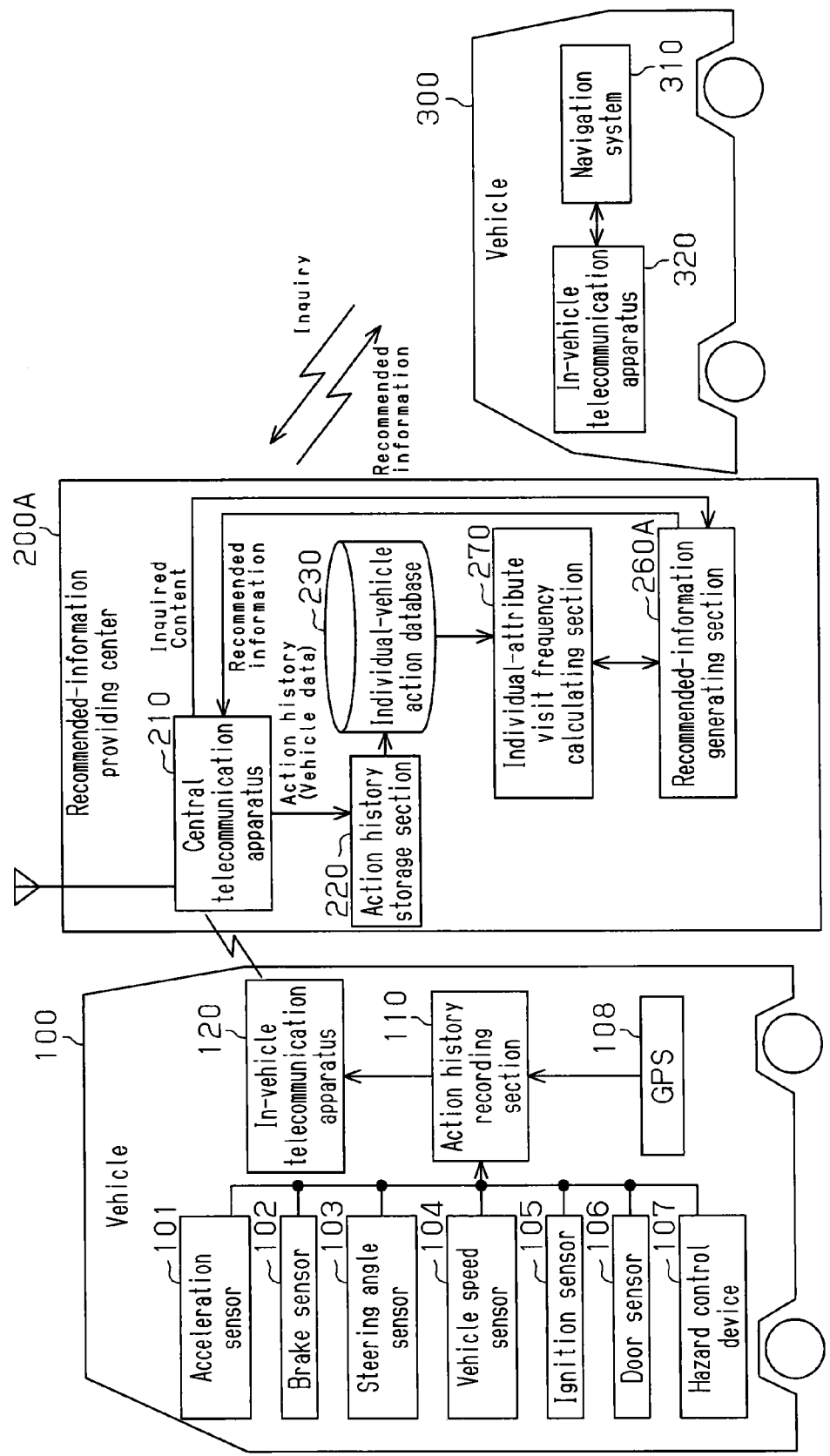
FIG. 5 is a block diagram of a schematic configuration of a recommended-information providing system according to a second embodiment of the present invention.

Next, a recommended-information providing system according to a second embodiment of the present invention will be described with reference to FIGS. 5 and 6. FIG. 5 is a schematic configuration of a recommended information system according to the present embodiment, which corresponds to FIG. 1 described above. Elements substantially identical to those in the first embodiment are labeled with symbols identical to those in the first embodiment, and explanations thereof are not repeated.

As shown in FIG. 5, a recommended-information providing center 200A according to the present embodiment comprises, instead of the drop-off/pick-up operation determination section 240 and drop-off/pick-up exit determination section 250 shown in FIG. 1 described above, an individual-attribute visit frequency calculating section 270 that calculates the frequency of visit of each vehicle according to each attribute of a destination.

Based on action histories of each vehicle recorded in an individual-vehicle action database 230, the individual-attribute visit frequency calculating section 270 obtains a point where each vehicle visits, according to, for example, the category of a clothing shop or restaurant among stores used as an attribute. The attribute of the point that a vehicle visited is identified based on, for example, position information included in the action history of each vehicle, and based on road map data (not shown) which is possessed by the recommended-information providing center 200A and in which the name, attribute, and the like, of each point are registered in advance.

The individual-attribute visit frequency calculating section 270 counts the obtained points each vehicle visited, according to each attribute. Then, individual-attribute visit frequency calculating section 270 obtains the frequencies of visits by a plurality of vehicles, in other words, the frequency of visit by the driver of each vehicle is obtained according to the category of each attribute of a destination and according to the category of each point such as a restaurant or clothing shop, which falls under the same attribute.

Upon receiving a request for guidance to an attribute "clothing shop" located near a vehicle 300 from a navigation system 310 incorporated in the vehicle 300, a recommended-information generating section 260A according to the present embodiment captures the result of the calculation from the individual-attribute visit frequency calculating section 270. Subsequently, the recommended-information generating section 260A captures the frequency of use of the attribute "clothing shop" by each user from the result of the calculation made by the individual-attribute visit frequency calculating section 270. Then, the recommended-information generating section 260A identifies the "clothing shop" with a high frequency of use, which is located within the specific area where the vehicle 300 that made the request is located. The individual-attribute visit frequency calculating section 270 delivers, as the recommended information, information indicating the name and position of the "clothing shop" thus identified, to the navigation system 310 (vehicle 300) that made the request via the central telecommunication apparatus 210.

In the vehicle 300 that may use the recommended information, the recommended information delivered from the recommended-information providing center 200 is received by an in-vehicle telecommunication apparatus 320, and the received recommended information is taken into the navigation system 310. Based on the recommended information taken in, the navigation system 310 provides, by means of voice, images, or the like, a route guide to the "clothing shop" with highest frequency of use by the user among the attribute "clothing shops" located near the vehicle 300 incorporating the navigation system 310.

Next, operation of the recommended-information providing system according to the present embodiment will be described with reference to FIG. 6.

Figure 6:
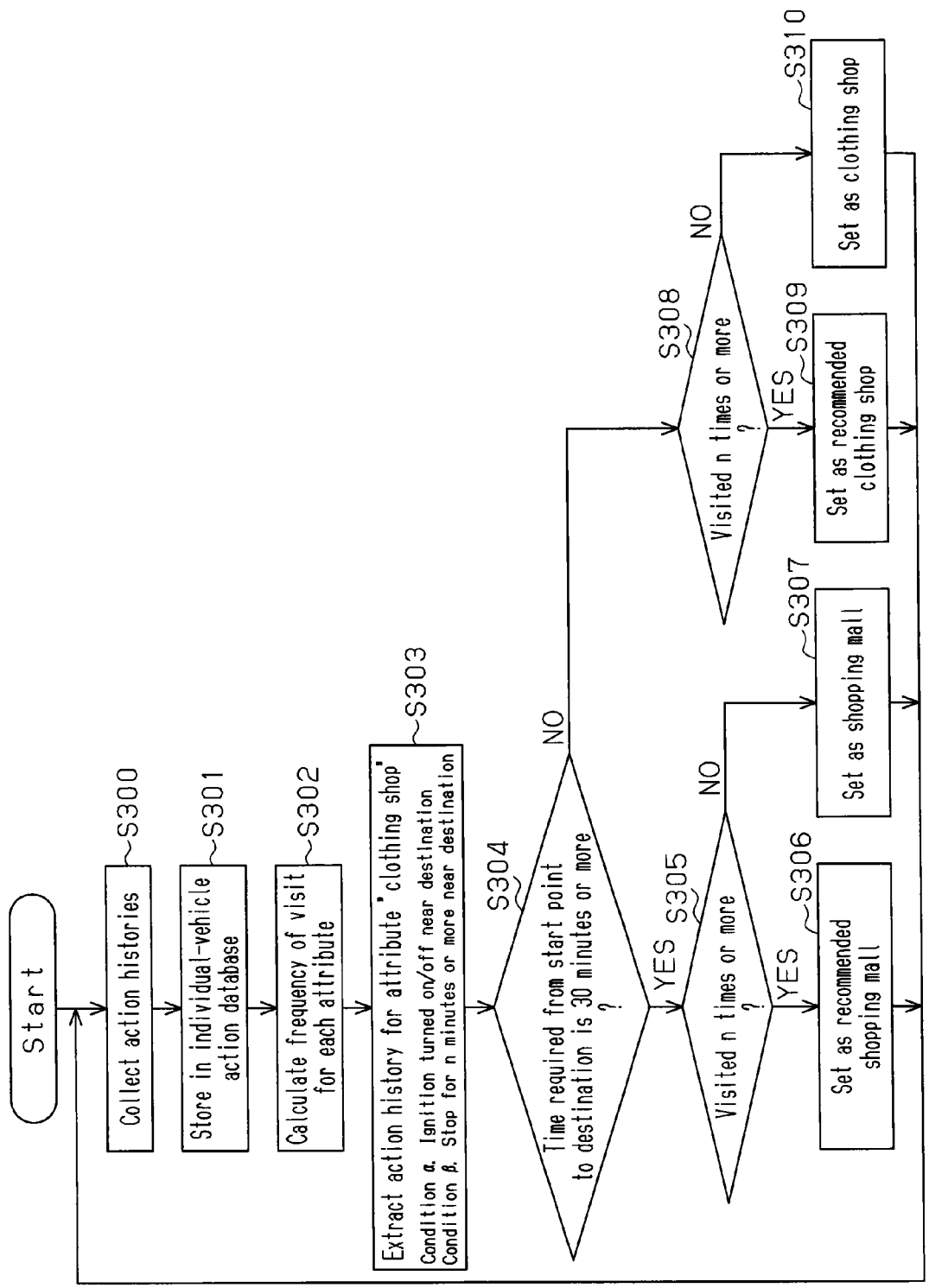
FIG. 6 is a flowchart illustrating an example of a procedure for generating recommended information by the recommended-information providing system.

As shown in FIG. 6, first in step S300, a plurality of action histories indicating a plurality of action patterns are collected from each vehicle, and the collected action histories of each vehicle are stored in the action history storage section 220 and individual-vehicle action database 230 (step S301).

Then, based on the action histories stored in the individual-vehicle action database 230, the frequency of visit to a point used as the destination of each vehicle is calculated according to the category of each attribute of the destination (step S302). Then, from among the action histories stored in the individual-vehicle action database 230, the action history for, for example, an attribute "clothing shop" is extracted (step S303). In this example, the on/off operation of an ignition has been performed near the destination (condition α). Also, the action history of a vehicle that has stayed near the destination for a predetermined time or longer (condition β) is extracted from the individual-vehicle action database 230.

Then, a determination is made whether the extracted action history indicates that the time required from a start point to the destination "clothing shop" is, for example, "30 minutes" or more, that is, whether the store used as destination is a large facility including "a clothing shop" that may be used by a user despite the given driving time (step S304).

If it is determined as a result that the extracted action history is a history indicating that the time required from the start point to the destination is, for example, "30 minutes" or more (YES in step S304), a determination is made whether the frequency of visit by each vehicle to the destination (the number of times that each vehicle visits), which is indicated by this history, is equal to or greater than "n times" specified for a discrimination whether the frequency of visit by each vehicle to the destination is high or not (step S305).

If the number of times that each vehicle visits the destination, included in the extracted action history, is equal to or greater than "n times" (YES in step S305), this destination is set as a "recommended shopping mall" that is visited by each user with high frequency (step S306).

If the number of times that each vehicle visits the destination, which is included in the extracted action history, is fewer than "n times" (NO in step S305), this destination is set merely as "a shopping mall" (step S307).

Also when the extracted action history is determined to be a history indicating that the time required from the start point to the destination is, for example, less than "30 minutes" (NO in step S304), a determination is made whether the number of times that each vehicle visits the destination, indicated by this history, is equal to or greater than "n times" (step S308).

If the number of times that each vehicle visits the destination, included in the extracted action history, is equal to or greater than "n times" (YES in step S308), this destination is set as a "recommended clothing shop" (step S309). Specifically, in this case, although the destination indicated by each action history is a small store located, for example, near the home of each user, the frequency of use of the small store by each user is high and, therefore, this destination is set as a clothing shop worthy of recommendation.

If the number of times that each vehicle visits the destination, which is included in the extracted action history, is fewer than "n times" (NO in step S308), this destination is set merely as "a clothing shop" (step S310).

Thus, information about a store worthy of recommendation is suitably generated based on each action history stored in the individual-vehicle action database 230. Then, if a guidance to an attribute "clothing shop" located near the vehicle 300 is requested through the navigation system 310 incorporated in the vehicle 300, information indicating the name, location, and so on of the store set as a "recommended shopping mall" or a "recommended clothing shop" is delivered as recommended information to the navigation system 310 that made the request.

As described above, according to the recommended-information providing system according to the present embodiment, advantages similar to the advantages (1) to (6) described above can be obtained, and also the advantages described below can be obtained instead of the advantages (7) to (9) described above.

(7A) A store is included as an attribute of the destination. Then, from among stores located in areas near the vehicle 300 incorporating the navigation system 310, to which recommended information is to be delivered, a store that each vehicle visits highly frequently is identified based on the action history, and information about the store thus identified is delivered, as recommended information, to the corresponding navigation system 310. Accordingly, based on the respective action histories of users who actually visited the store, collected in the recommended-information providing center 200A, recommended information in which the preferences of each user are reflected can be provided.

(8A) Based on the time required for the destination of each vehicle, it is determined whether the destination is "a shopping mall" that has a clothing shop or not. Accordingly, based on the respective action histories collected from vehicles, recommended information that is capable of providing guidance for the attributes of a store can be provided in more detail.

Third Embodiment

Figure 7:
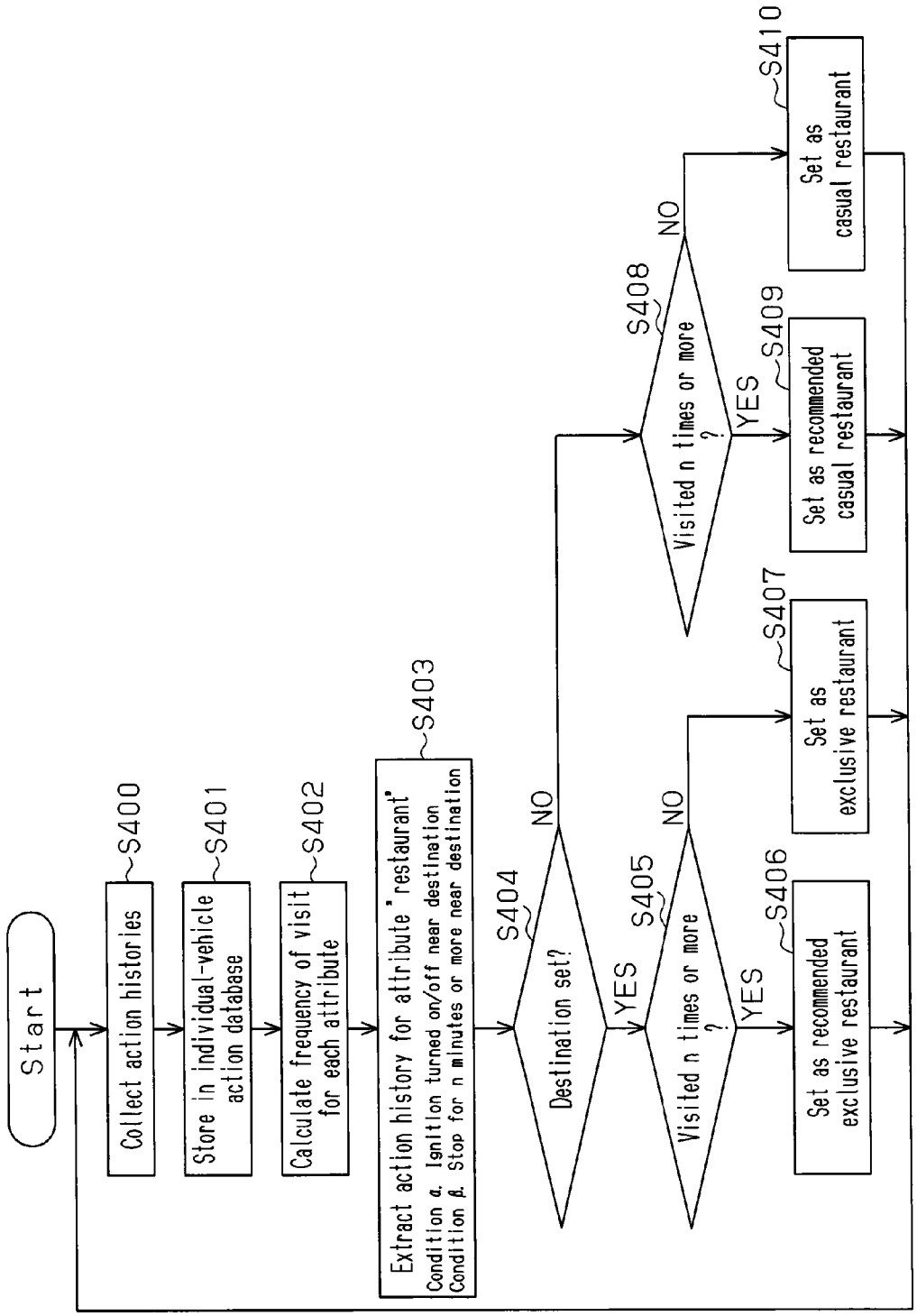
FIG. 7 is a flowchart illustrating an example of a procedure for generating recommended information in a recommended-information providing system according to a third embodiment of the present invention.

A recommended-information providing system according to a third embodiment of the present invention will be described below with reference to FIG. 7. FIG. 7 is a schematic configuration of a recommended information system according to the present embodiment, which corresponds to FIG. 6 described above. Elements substantially identical to those in the first and second embodiments are labeled with symbols identical to those in the first and second embodiments, and explanations thereof are not repeated. The present embodiment provides, as the recommended information, information for guiding to a "restaurant" worthy of recommendation when the attribute of the destination is a "restaurant". Additionally, the action histories collected in a recommended-information providing center 200A according to the present embodiment include histories set for a destination with respect to a navigation system, or the like, incorporated in a vehicle.

As shown in FIG. 7, to generate recommended information using the recommended-information providing system according to the present embodiment, first in step S400, a plurality of action histories indicating a plurality of action patterns are collected from each vehicle, and the collected action histories of each vehicle are stored in the action history storage section 220 and individual-vehicle action database 230 (step S401).

Then, based on action histories stored in the individual-vehicle action database 230, the frequency of visit to a point used as the destination of each vehicle is calculated according to the category of each attribute (S402). Then, from among the action histories stored in the individual-vehicle action database 230, the action history for, for example, an attribute "restaurant" is extracted (step S403). In this example also, the on/off operation of an ignition has been performed near the destination (condition α). Also, the action history of a vehicle that has stayed near the destination for a predetermined time or longer (condition β) is extracted from the individual-vehicle action database 230.

Then, it is determined whether the extracted action history is a history in which, when a vehicle from which information is collected goes to a "restaurant, the "restaurant" has been set as a destination in a navigation system or the like incorporated in the vehicle (step S404). Specifically, a determination is made whether a "restaurant" included in the action history is a store worthy of use by each user even by setting the shop as a destination in the navigation system or the like.

If it is determined as a result that a set history is present as a destination (YES in step S404), a determination is made whether the frequency of visit by each vehicle to the destination (the number of times that each vehicle visits), which is indicated by this history, is equal to or greater than "n times" specified for a discrimination whether the frequency of visit by each vehicle to the destination is high or not (step S405).

If the number of times that each vehicle visits the destination, included in the extracted action history, is equal to or greater than "n times" (YES in step S405), this destination is set as a "recommended exclusive restaurant" that the frequency of use by each user is high (step S406).

If the number of times that each vehicle visits the destination, which is included in the extracted action history, is fewer than "n times" (NO in step S405), this destination is set as "an exclusive restaurant" (step S407).

If it is determined in the preceding step S404 that a set history as a destination is not present, a determination is made whether the number of times that each vehicle visits the destination, indicated by this history, is equal to or greater than "n times" (step S408).

If the number of times that each vehicle visits the destination, included in the extracted action history, is equal to or greater than "n times" (YES in step S408), this destination is set as a "recommended casual restaurant" (step S409). Specifically, in this case, the destination included in the action history is a "casual restaurant" that is not registered in the navigation system or the like, or that is not generally set in the navigation system. However, since the frequency of use by each user is high, the "casual restaurant" is set as a "restaurant" worthy of recommendation.

If the number of times that each vehicle visits the destination, which is included in the extracted action history, is fewer than "n times" (NO in step S408), this destination is set as a "casual restaurant" (step S410).

Thus, information about a store worthy of recommendation is suitably generated based on each action history stored in the individual-vehicle action database 230. Then, if guidance to an attribute "restaurant" located near the vehicle 300 is requested through the navigation system 310 incorporated in the vehicle 300, information indicating the name, location, and so on of the store set as a "recommended exclusive restaurant" or a "recommended casual restaurant" is delivered, as recommended information, to the navigation system 310 that made the request.

As described above, according to the recommended-information providing system according to the present embodiment, advantages similar to the advantages (1) to (6) described above can be obtained, and also the advantages described below are obtained, instead of the advantages (7) to (9) described above.

(7B) Recommended information about a "restaurant" as an attribute of the destination is generated and provided. The attribute of the "restaurant" is further categorized into an "exclusive restaurant" and a "casual restaurant," and recommended information for guidance to the store worthy of recommendation is generated and provided according to each category of restaurant. Accordingly, it is possible to provide a variety of information about a destination as recommended information. Also, it is possible to analyze action histories in more detail and to provide recommended information, based on action histories such as setting/non-setting a destination in the navigation system.

Fourth Embodiment

Figure 8:
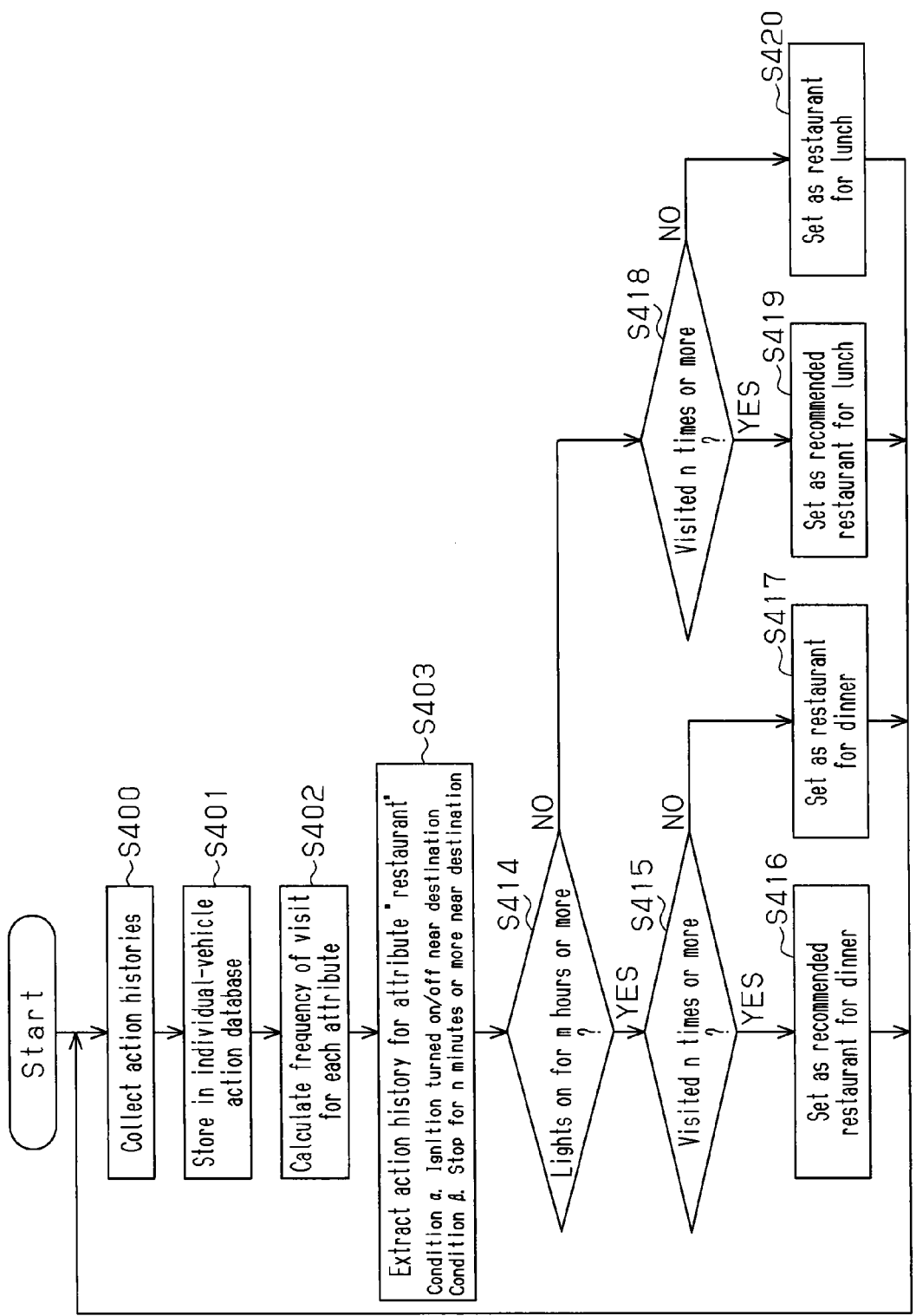
FIG. 8 is a flowchart illustrating an example of a procedure for generating recommended information in a recommended-information providing system according to a fourth embodiment of the present invention.

A recommended-information providing system according to a fourth embodiment of the present invention will be described below with reference to FIG. 8. FIG. 8 is a schematic configuration of a recommended information system according to the present embodiment, which corresponds to FIG. 6 described above. Elements substantially identical to those in the first and second embodiments are labeled with symbols identical to those in the first and second embodiments, and explanations thereof are not repeated. The present embodiment provides, as recommended information, information for guidance to a "restaurant" worthy of recommendation when the attribute of the destination is a "restaurant". Additionally, the action histories collected in a recommended-information providing center 200A according to the present embodiment include the history of use of a vehicle's headlights.

As shown in FIG. 8, to generate recommended information using the recommended-information providing system according to the present embodiment, processes in steps S400 to S403 shown in FIG. 7, described above, are first performed, and then it is determined whether the action history extracted in step S403 includes the history of use of a vehicle's headlights or not. That is, a determination is made whether the time of day when the vehicle left for the destination is evening or night or not (step S414).

If it is determined as a result that the history of use of headlights is included in the action history (YES in step S414) and that the headlights were on, for example, for m hours or longer, a determination is made whether the frequency of visit by each vehicle to the destination (the number of times that each vehicle visits), which is indicated by this history, is equal to or greater than "n times" specified for the discrimination whether the frequency of visit by each vehicle to the destination is high or not (step S415).

If the number of times that each vehicle visits the destination, included in the extracted action history, is equal to or greater than "n times" (YES in step S415), this destination is set as a "recommended restaurant for dinner" that is used by each user with high frequency (step S416).

If the number of times that each vehicle visits the destination, which is included in the extracted action history, is fewer than "n times" (NO in step S415), this destination is set merely as a "restaurant" (step S417).

If it is determined in the preceding step S414 that the history of use of headlights is not included, a determination is made whether the number of times that each vehicle visits the destination, indicated by this history, is equal to or greater than "n times" (step S418). That is, in this case, since the headlights are not used during the vehicle's traveling, it is determined that the time of day when the vehicle left for the destination is morning or afternoon.

If the number of times that each vehicle visits the destination, included in the extracted action history, is equal to or greater than "n times" (YES in step S418), this destination is set as a "recommended restaurant for lunch" (step S419).

If the number of times that each vehicle visits the destination, which is included in the extracted action history, is fewer than "n times" (NO in step S418), this destination is set merely as "a restaurant for lunch" (step S420).

Thus, information about a store worthy of recommendation is suitably generated based on each action history stored in an individual-vehicle action database 230. Then, if guidance to an attribute "restaurant" located near the vehicle 300 is requested through a navigation system 310 incorporated in the vehicle 300, information indicating the name, location, and so on of the store set as a "recommended restaurant for dinner" or a "recommended restaurant for lunch" is delivered, as recommended information, to the navigation system 310 that made the request.

As described above, according to the recommended-information providing system according to the present embodiment, advantages similar to the advantages (1) to (6) described above can be obtained, and also the advantages described below can be obtained instead of the advantages (7) to (9) described above.

(7C) Recommended information about a "restaurant" as an attribute of the destination is generated and provided. The attribute of the "restaurant" is further categorized into a "restaurant for dinner" and a "restaurant for lunch," and recommended information for guidance to the store worthy of recommendation is generated and provided according to each category of restaurant. Accordingly, it is possible to provide a variety of information about a destination as the recommended information. Also, it is possible to analyze action histories in more detail and to provide recommended information, based on the history of use of headlights.

Other Embodiments

Each embodiment described above can also be implemented in the form described below.

In the fourth embodiment, according to a request for guidance to an attribute "restaurant," recommended information for guidance to a "recommended restaurant for dinner" and "recommended restaurant for lunch" are provided. However, the invention is not limited by this and, for example, a "recommended restaurant for dinner" or a "recommended restaurant for lunch" may be selectively provided according to the time of day when guidance to an attribute "restaurant" is requested. Accordingly, it is possible to provide recommended information with more consideration to the environment surrounding the place to which the recommended information is provided.

In each embodiment, the action histories of the vehicle 100 are transmitted to the recommended-information providing center 200, 200A from the vehicle 100 on condition that the ignition of the vehicle 100 is switched from an on-state to an off-state. In contrast, the action histories of the vehicle 100 may be transmitted to the recommended-information providing center 200, 200A from the vehicle 100 on condition that the ignition of the vehicle 100 is switched from an off-state to an on-state. In addition, for example, on condition that the state in which the travel speed of the vehicle 100 is maintained at "0 km/h" for a fixed time is detected based on detection results obtained by the acceleration sensor 101 and vehicle speed sensor 104, or on condition that a predetermined period of time elapses, action histories accumulated in the vehicle 100 may be transmitted from the vehicle 100 to the recommended-information providing center 200, 200A.

In each embodiment, the action histories of each vehicle collected in the recommended-information providing center 200, 200A are stored in the individual-vehicle action database 230 for each vehicle. Instead of doing this, the driver of each vehicle may be identified based on the action patterns of the vehicle indicated by action histories, and the collected action histories may be stored in the individual-vehicle action database 230 for each of the identified drivers. Similarly, information about the owner of each vehicle may be managed in advance in the recommended-information providing center 200, 200A and, based on management information about the owners; the collected action histories may be stored in the individual-vehicle action database 230 for each driver. In this case, action histories collected in the recommended-information providing center 200, 200A are managed for each driver for whom an action pattern has been determined. Additionally, in each embodiment, the individual-vehicle action database 230 may be omitted in configuration, and action histories collected from each vehicle may be stored collectively without being categorized.

In the first embodiment, information for guidance to an entrance provided with a drop-off/pick-up space in a station that has a plurality of entrances is provided as the recommended information. However, the invention is not limited by this and, for example, if the attribute of a destination is a large store with a plurality of parking spaces facing roads in many directions, recommended information may be generated and provided in which a parking space with a high frequency of visit by vehicles, which is included in the collected action histories, is recommended as a parking space that is very convenient to use. Similarly, recommended information may be generated and provided, in which a point with high frequency of drop-off/pick-up by a vehicle, which is included in the collected action histories, is guided as a point provided with a drop-off/pick-up space, or the like, suitable for drop-off/pick-up in a large store.

In the first embodiment, as the recommended information, information for guidance to a point suitable for drop-off/pick-up at a facility with a plurality of entrances is provided. In each of the second to fourth embodiments, as the recommended information, information about a store worthy of recommendation is provided. Additionally, a traveling route that is used highly frequently may be identified among traveling routes to each destination based on the action histories collected in the recommended-information providing center 200, 200A and, and guidance for this traveling route may be provided as well as guidance to a destination worthy of recommendation. In this case, it is possible to provide, as well as guidance to a destination worthy of recommendation, guidance for a traveling route to the destination. Thus, even if a recommended destination is located in a place that a user of the recommended information visits for the first time, the user of the recommended information can be guided to the destination accurately based on the action histories of vehicles in which the action patterns of a plurality of users familiar with the place are reflected.

In the first embodiment, an entrance with a high frequency of visit by each vehicle is determined as a recommended point provided with a drop-off/pick-up space. Instead of this, an entrance with a variety of distribution in the traveling direction of vehicles exiting that entrance of, for example, the station 40, or an entrance with a variety of distribution in the traveling direction of vehicles entering the entrance of the station 40, may be determined as an entrance worthy of recommendation, for example, in a case where running restrictions such as one-way traffic are not provided.

In each embodiment, as an action history from the start point of each vehicle to a destination, the travel time and travel distance for each vehicle are included. Instead of this, only the travel time or travel distance for each vehicle may be included as the action history from the start point of each vehicle to a destination. Also, instead of this, the traveling route from the start point of each vehicle to its destination may be included as an action history from the start point of each vehicle to its destination. Additionally, as the action history from the start point of each vehicle to its destination, for example, the history of use of the vehicle's wipers may be collected. In this case, based on action histories including the history of use of the wipers, information for guidance to a destination used highly frequently owing to rain may be provided as the recommended information when the drive environment of the vehicle 300 to which the recommended information is delivered is rainy.

In the first embodiment, as the action histories for the vehicle 100, the opening/closing history of the door or doors of the vehicle 100, detected by the door sensor 106, and the history of use of the vehicle's hazard lamps based on a control result obtained by the hazard control device 107 are collected. Based on such an opening/closing history of the door of doors and such a history of use of the hazard lamps, the presence or absence of the drop-off/pick-up of a person at a destination is determined. Instead of this, based on only the opening/closing history of door or doors or the history of use of the hazard lamps, the presence or absence of the drop-off/pick-up of a person at a destination of the vehicle 100 may be determined. Additionally, the presence/absence of the drop-off/pick-up of a person or whether the vehicle 100 stayed at a destination or not may be determined based on, for example, the change history of a seat position, the detection results obtained by various sensors or the like for detecting the presence/absence of a passenger on a seat, the history of use of parking brake, and the like. Alternatively, whether the vehicle 100 stayed at a destination or not may be determined based on detection results obtained by various sensors such as the acceleration sensor 101, brake sensor 102, steering angle sensor 103, and vehicle speed sensor 104, the activation of an in-vehicle network such as CAN, and the like. Similarly, based on only the travel history of the vehicle 100 from its start point to its destination, the drop-off/pick-up history of a person by the vehicle 100 may be identified. In this case the action history of the vehicle traveling back and forth between its start point and its destination is identified as a drop-off/pick-up history.

As the action histories at a destination, time spent at the destination by each vehicle is collected, and also the frequency of visit by each vehicle to the destination is counted. Alternatively, vehicle data including the frequency of visit by each vehicle to the destination may be collected as the action history for each vehicle. In this case, each time a period of, for example, one month passes, the action histories are transmitted from each vehicle to the recommended-information providing center 200, 200A. Alternatively, as action histories, histories including only time spent at a destination or the frequency of visit to the destination by the vehicle 100 may be collected. For example, in the first embodiment, an entrance where the total time spent at each destination by each vehicle is longer relative to the others may be identified as an entrance provided with a drop-off/pick-up space. Similarly, in each of the second to fourth embodiments, the store where the total time spent by each vehicle at its destination is longer relative to the others may be identified as a recommended store highly frequently used by each user. Additionally, in a case where a vehicle as a source from which action histories are captured uses gasoline or the like as a fuel, the fuel supply history of the vehicle and information about the place where the fuel is supplied may be collected as action histories at the destination. In this case, based on the action history, a gas station highly frequently used by each user is identified as a store worthy of recommendation owing, for example, to the low sales price of fuel, and information for guidance to the gas station thus identified can be provided as recommended information. Similarly, for example, in the case where a vehicle as a source from which action histories are captured is a plug-in hybrid vehicle, electric vehicle, or the like, the charge history of each vehicle and information about the place where the vehicle is charged may be collected as action histories at the destination. In this case, through collection of such action histories, it is possible to identify a charging station located in each running area, and position information about the charging station and a route to the charging station can be provided as recommended information.

In each embodiment, as the action histories, histories in which the action history from the start point of the vehicle 100 to a destination and the action history as the vehicle 100 reaches the destination are related to each other, and collected. Instead of this, as action histories, action histories until the vehicle 100 reaches a destination from its start point and action histories of the vehicle 100 at the destination may be collected in the recommended-information providing center 200, 200A as action histories separately. Then, histories highly relevant to each other among histories collected separately in the recommended-information providing center 200, 200A may be related to each other in the recommended-information providing center 200, 200A.

In each embodiment, as the action histories, the action history from the start point of the vehicle 100 to a destination and the action history as the vehicle 100 reaches the destination are collected. Instead of this, as the action histories, only the action histories from the start point of each vehicle to a destination may be collected. In this case, for example, a destination highly frequently determined as a final location in the action histories is set as a destination worthy of recommendation. In this case, a destination comparatively distant in both space and time from the start point is set as a destination worthy of recommendation, since the destination is highly worthy of a visit by each user even if the destination is far. Similarly, in this case, based on the traveling distance and traveling time from the start point to the destination, a destination located nearer to an information terminal, to which recommended information is provided, is set as a destination that is very convenient to use and worthy of recommendation. In comparison with this, only the action histories of each vehicle at a destination may be collected. In this case, for example, action histories including the opening/closing history of a door or doors, the history of use of the hazard lamps, and the like, at the destination are identified as drop-off/pick-up histories. In this case also, a destination indicated with high frequencies by the action histories is set as a destination worthy of recommendation since frequency of use by each user is high.

In the first embodiment, as the recommended information, information about a point provided with a drop-off/pick-up space at a destination is provided. In each of the second to fourth embodiments, information about a store is provided. Instead of this, recommended information provided by the recommended-information providing center 200, 200A may be any recommended information generated based on action histories collected from a plurality of vehicles.

In each embodiment, as an information terminal to which recommended information is delivered, the navigation system 310 incorporated in the vehicle 300 is used. Instead of this, a device to which recommended information is delivered may be one which is capable of outputting the recommended information in a form that a user can recognize. For instance, the device may be the terminal of a personal computer, a mobile phone, or the like, connected to a network.

In each embodiment, the action histories of the vehicle 100 are collected based on information captured through the acceleration sensor and the other sensors, 101 to 108, and so on, incorporated in the vehicle 100. Instead of this, action histories of the vehicle 100 may be collected by, for example, a mobile phone, or the like, which is used in a vehicle and includes position information detecting means such as a GPS. In this case, the travel history from the start point of the vehicle 100 to a destination is detected by position information detecting means incorporated in the mobile phone or the like. Additionally, action histories of the vehicle 100 at a destination are detected based on the time spent and so on of the vehicle 100, detected by the position information detecting means incorporated in the mobile phone or the like. Furthermore, a moving body serving as a source from which action histories are captured may be one in which the action patterns of the user are reflected, and various information terminals or the like may be used.

In each embodiment, the action histories are collected from a plurality of moving bodies. Instead of this, for example, where one moving body is used by a plurality of users, as in car sharing, the action histories of one moving body may be collected as histories used for generating the recommended information.

DESCRIPTION OF THE REFERENCE NUMERALS

10 . . . First entrance at station
11, 12 . . . Drop-off/pick-up pattern
20 . . . Railroad
30 . . . Second entrance at station
31-36 . . . Drop-off/pick-up pattern
40 . . . Station as attribute of destination
41 . . . Drop-off/pick-up space
100 . . . Vehicle (moving body)
101 . . . Acceleration sensor
102 . . . Brake sensor
103 . . . Steering angle sensor
104 . . . Vehicle speed sensor
105 . . . Ignition sensor
106 . . . Door sensor
107 . . . Hazard control device
108 . . . GPS
110 . . . Action history recording section
120 . . . In-vehicle telecommunication apparatus
200, 200A . . . Recommended-information providing center
210 . . . Central telecommunication apparatus
220 . . . Action history storage section
230 . . . Individual-vehicle action database
240 . . . Drop-off/pick-up determination section
250 . . . Drop-off/pick-up exit determination section
260, 260A . . . Recommended-information generating section
270 . . . Individual-attribute visit frequency calculating section
300 . . . Vehicle
310 . . . Navigation system (information terminal)
320 . . . In-vehicle telecommunication apparatus

The invention claimed is:

1. A recommended-information providing system that outputs recommended information about a destination for an information terminal, the system comprising:
a telecommunication apparatus configured to receive a plurality of action histories based on a plurality of action patterns of one or more moving bodies from the one or more moving bodies, the plurality of action histories including position information of the one or more moving bodies;
an action history storage configured to collect the plurality of action histories received from the one or more moving bodies; and
a processor configured to generate the recommended information for identified entrances of a facility at the destination based on the plurality of collected action histories, wherein
the telecommunication apparatus is further configured to output the recommended information generated according to attributes of the destination for the information terminal,
the information terminal is configured to provide a user with the recommended information,
the attributes define various stores and various public facilities of the destination,
the plurality of action histories include a drop-off/pick-up history of the one or more moving bodies from a starting point to the destination determined based upon the position information of the one or more moving bodies, and
the processor is further configured to:
identify an entrance of the identified entrances with a largest variety of distribution in a traveling direction of the one or more moving bodies exiting the entrance or entering the entrance as an entrance with a drop-off/pick-up space in which a moving body for drop-off/pick-up is to stay based upon the drop-off/pick-up history, and
generate information for guidance to the entrance with the drop-off/pick-up space as the recommended information.

2. The recommended-information providing system according to claim 1, wherein
the one or more moving bodies are vehicles, and
the action history storage is configured to collect the plurality of action histories based on the plurality of action patterns of the one or more moving bodies as action histories of one or more vehicles based on a plurality of types of vehicle operation.

3. The recommended-information providing system according to claim 2, wherein the action history storage is configured to collect the plurality of action histories as action histories of the one or more vehicles at the destination.

4. The recommended-information providing system according to claim 2, wherein the action history storage is configured to collect the plurality of action histories as action histories from a start point of the one or more vehicles to the destination.

5. The recommended-information providing system according to claim 2, wherein the action history storage is configured to collect the plurality of action histories as histories in which an action history from a start point to the destination of each vehicle and an action history of the vehicle at the destination after reaching the destination are related to each other.

6. The recommended-information providing system according to claim 3, wherein the action history storage is configured to collect the plurality of action histories at the destination including time spent at the destination by each vehicle and a frequency of visits to the destination by each vehicle.

7. The recommended-information providing system according to claim 3, wherein the action history storage is configured to collect the plurality of action histories at the destination including at least either an opening/closing history of doors other than a door at a driver's seat of the one or more vehicles or a history of use of hazard lamps of the one or more vehicles.

8. The recommended-information providing system according to claim 4, wherein the action history storage is configured to collect the plurality of action histories from the start point of the one or more vehicles to the destination including travel time and travel distance of the one or more vehicles.

9. The recommended-information providing system according to claim 1, wherein the processor is further configured to identify a store with a high frequency of visits by the one or more moving bodies based on the plurality of action histories from among stores located in an area near the information terminal to which recommended information is to be delivered, and the telecommunication apparatus is configured to deliver information about the identified store to the corresponding information terminal as the recommended information.

10. The recommended-information providing system according to claim 1, further comprising a vehicle, wherein the one or more moving bodies are vehicles, the vehicle is the moving body for drop-off/pick-up, and the vehicle includes:

an in-vehicle telecommunication apparatus configured to receive the information for guidance to the entrance with the drop-off/pick-up space, and a navigation system configured to provide the user with guidance for driving the vehicle on a route to the entrance with the drop-off/pick-up space based upon the information for guidance.

11. The recommended-information providing system according to claim 10, wherein the navigation system further includes a display configured to provide the user images of the route to the entrance with the drop-off/pick-up space based upon the information for guidance.

* * * * *